United States Patent
Wang et al.

(10) Patent No.: US 7,180,963 B2
(45) Date of Patent: Feb. 20, 2007

(54) DIGITAL RECEIVER CAPABLE OF PROCESSING MODULATED SIGNALS AT VARIOUS DATA RATES

(75) Inventors: Tzu-Pai Wang, Taipei Hsien (TW); Chun-Hsien Lee, Taipei Hsien (TW)

(73) Assignee: ALI Corporation, Taipei (TW)

( * ) Notice: Subject to any disclaimer, the term of this patent is extended or adjusted under 35 U.S.C. 154(b) by 816 days.

(21) Appl. No.: 10/302,845

(22) Filed: Nov. 25, 2002

(65) Prior Publication Data

US 2004/0101068 A1    May 27, 2004

(51) Int. Cl.
    *H04L 27/14* (2006.01)
    *H03D 3/24* (2006.01)
    *H03D 1/00* (2006.01)
    *H04B 1/00* (2006.01)

(52) U.S. Cl. ............ 375/324; 375/326; 375/327; 375/340; 375/130

(58) Field of Classification Search .......... 375/150, 375/324, 326–327, 340, 343, 147, 260–261, 375/142–143; 455/63.1, 130, 67.13; 370/310, 370/319, 482
See application file for complete search history.

(56) References Cited

U.S. PATENT DOCUMENTS

| 5,712,870 | A * | 1/1998 | Petrick | 375/147 |
| 5,793,818 | A * | 8/1998 | Claydon et al. | 375/326 |
| 5,966,401 | A * | 10/1999 | Kumar | 375/150 |
| 6,212,246 | B1 * | 4/2001 | Hendrickson | 375/355 |
| 2001/0050926 | A1 * | 12/2001 | Kumar | 370/529 |
| 2002/0097787 | A1 * | 7/2002 | Ozluturk et al. | 375/152 |
| 2003/0078021 | A1 * | 4/2003 | Dale | 455/260 |
| 2006/0166619 | A1 * | 7/2006 | Roberts | 455/39 |

OTHER PUBLICATIONS

Fakatsellis, John, "Processing Gain for Direct Sequence Spread Spectrum Communication Systems and PRISM®", Intersil TM, Aug. 1996, pp. 1-4.*
Pearson, Bob, "Complementary Code Keying Made Simple", Intersil TM, May 2000, pp. 4-1-4-7.*

* cited by examiner

*Primary Examiner*—Kevin Kim
*Assistant Examiner*—Linda Wong
(74) *Attorney, Agent, or Firm*—Pillsbury Winthrop Shaw Pittman LLP

(57) ABSTRACT

A digital receiver is enabled to process modulated signals at various data rates including a sampling circuit for receiving modulated signals and outputting digitalized sampled signals, a matched filter for expelling noise from digitalized sampled signals at a first data rate and at a second data rate and generating in-phase and quadrature-phase signals, a barker code correlator for depreading digitalized sampled signals at first data rate, a channel equalizer which counteracts co-channel interferences by using equalizer coefficients obtained from a plurality of noise whitening coefficients so as to generate a sequence of symbol decisions therefrom, a CCK correlator coupled to the channel equalizer for decoding signals at the second data rate and at a third data rate, a first quantization filter for recovering transmitted signals at the first data rate, and a second quantization fitler for recovering transmitted signals at the second data rate and at the third data rate.

40 Claims, 4 Drawing Sheets

DIGITAL RECEIVER CAPABLE OF PROCESSING MODULATED SIGNALS AT VARIOUS DATA RATES

FIELD OF THE INVENTION

The present invention is generally related to a spread spectrum communication system, and in particular, the present invention is related to a digital receiver that is designed to be equipped with demodulation units for modulated signals at various data rates in a spread spectrum communication system.

BACKGROUND OF THE INVENTION

IEEE 802.11 wireless local area network (wireless LAN) is by far the most popular high-speed wireless communication network system today. IEEE 802.11 wireless local area network utilizes orthogonal frequency division multiplexing (OFDM) technique as a manor frequency modulation technique. OFDM introduces multi-carrier modulation technique to encode data bits into multiple sub-carriers. Unlike single carrier modulation system, in an OFDM system all frequencies are sent simultaneously in time. OFDM offers several advantages over single carrier modulation system in terms of better multipath effect immunity, simple channel equalization and relaxed timing acquisition constraints.

IEEE standard 802.11 prescribes the media access control (MAC) and physical (PHY) layers for a local area network wireless connectivity. In addition, IEEE standard 802.11 further defines three physical characteristics for wireless local area networks: diffused infrared, direct sequence spread spectrum (DSSS) and frequency hopping spread spectrum (FHSS), wherein the DSSS system has become a mainstream due to its high coding gain and robustness against interferences and noise. DSSS is a transmission technology used in wireless LAN system signal transmissions where a data signal at the transmitting station is combined with a higher data rate bit sequence, or chipping code, that divides the user data according to a spreading ratio. The chipping code is a redundant bit pattern for each bit that is transmitted, which increases the signal's resistance to interference. If one or more bits in the pattern are damaged during transmission, the original data can be recovered due to the redundancy of the transmission.

In a DSSS system, binary data bits are grouped into chunks and each chunk is mapped to a particular waveform termed a symbol which is transmitted across the channel after modulation with sub-carrier signal. These data symbols are transmitted over multiple channels by sub-carrier signals having orthogonal characteristics. However, if the sub-carrier frequency of digital receiver is not synchronous with the that of transmitter, the orthogonality of sub-carrier will vanish and severe inter-carrier interference (ICI) will be induced. In addition to the inter-carrier interference, the channel response of co-channel will interfere data symbols in a receiver. This co-channel interfering signals due to multi-path channel propagation is called inter-symbol interference (ISI). These crosstalk interferences are unwanted by-products in the middle of wireless communication, and the measurement and suppression of these interfering signals are the major goals that the wireless communication system designers are striving for.

Furthermore, for the current digital receiver used in a wireless communication system, it is feasible for processing modulated signals at one or two data rates only. When the modulated signals are transmitted through multi-path channels, there is a strong likelihood that portions of the modulated signals can not be accurately recovered to original data stream due to mismatch of demodulation units. According to IEEE 802.11 standard, in a DSSS system radio frequency signals at data rate of 5.5 or 11 Mbps are modulated by a coding technology called CCK (complementary code keying) modulation, which utilizes a series of codes called complementary sequences to multiply with original data stream. For radio frequency signals at data rate of 1 or 2 Mbps, the original data stream is multiplied by a spreading sequence or chipping code called barker code. Therefore, in order to recover the modulated signals to original data stream, an appropriate correlator must be employed in a receiver to remove spreading codes and retrieve original data stream. For example, a barker code correlator is used to synchronize the phase of a local barker spreading codes with received barker spreading codes in order to despread and recover data signal at ½ Mbps from a spread signal, whereas a CCK correlator is used to synchronize the phase of a local complementary codes with received complementary codes in order to recover data signal at 5.5 or 11 Mbps from a spread signal.

Accordingly, for the purpose of processing data signals at various data rates in a spread spectrum communication system, there is an inclination to provide a digital receiver capable of simultaneously processing modulated signals at various date rates, for example, 1, 2, 5.5 and 11 Mbps, with an embedded decision feedback equalizer (DFE) provided with ICI/ISI cancellation arrangement that can cope with channel-induced distortions.

SUMMARY OF THE INVENTION

The present invention is attained by a digital receiver capable of processing modulated spread signals at various data rates. In an exemplary embodiment of the present invention, a digital receiver capable of receiving and decoding modulated signals at various data rates, e.g. 1, 2, 5.5 and 11 Mbps is set forth and includes a sampling circuit which receives the outputs of a radio frequency demodulator and operates at a fixed and asynchronous sampling rate for receiving transmitted signals and outputting digitalized sampled symbols, a channel matched filter for expelling noise from digitalized sampled symbols at a first data rate and at a second data rate and generating in-phase and quadrature-phase signals, a barker code correlator coupled to the channel matched filter which uses a 11-chip barker code to despread digitalized sampled symbols, a decision feedback equalizer which counteracts co-channel interferences by using equalizer coefficients obtained from a plurality of noise whitening coefficients so as to generate a series of symbol decisions therefrom, a CCK correlator coupled to the decision feedback equalize for decoding signals at the second data rate and a third data rate, a first quantization filter for recovering transmitted signals at the first data rate, and a second quantization filter for recovering transmitted signals at the second data rate and at the third data rate.

Specifically, the sampling circuit includes an analog-to-digital converter and the digital receiver according to an exemplary embodiment of the invention further includes an interpolator coupled to the sampling circuit for adjusting a sampling frequency offset and a sampling phase offset of the digitalized sampled signals generated by the sampling circuit by interpolating the digitalized sampled signals according to an interpolation coefficient, a derotator coupled to the interpolator for compensating a carrier phase offset according to a phase-adjusting signal, a timing recovery loop for calculating a sampling frequency offset and a sampling phase offset to control an interpolation of the interpolator, and a carrier recovery loop for locking on a carrier phase offset and in response thereto generating the phase-adjusting signal.

The decision feedback equalizer is embodied with a feedforward filter (precursor filter), a feedback filter (postcursor filter), an equalizer coefficient calculator and a combiner. The first quantization filter includes a first slicer which quantizes digitalized sampled signals at the first date rate according to a reference slice signal to produce digital symbols, and a first differential decoder coupled to the first slicer for removing a phase ambiguity of the digital symbols. Besides, the second quantization filter includes a peak selector which outputs largest outputs of the CCK corrrlator as parallel digital samples, a second slicer which quantizes the parallel digital samples at the second data rate and at the third date rate according to a reference slice signal to produce parallel digital symbols, a second differential decoder which removes a phase ambiguity from the parallel digital symbols, and a parallel-in-serial-out shift register for converting the parallel digital symbols into serial digital symbols.

At the output end of the digital receiver, it further includes a descrambler coupled to the first quantization filter and the second qualization filter for subtracting a pseudo noise sequence from digital symbols, and a cyclic redundancy check (CRC) checker configured to detect an error within a header of a data packet.

Now the foregoing and other features and advantages of the present invention will be more clearly understood through the following descriptions with reference to the accompanying drawings, in which:

DETAILED DESCRIPTION OF THE PREFERRED EMBODIMENT

Figure 1:
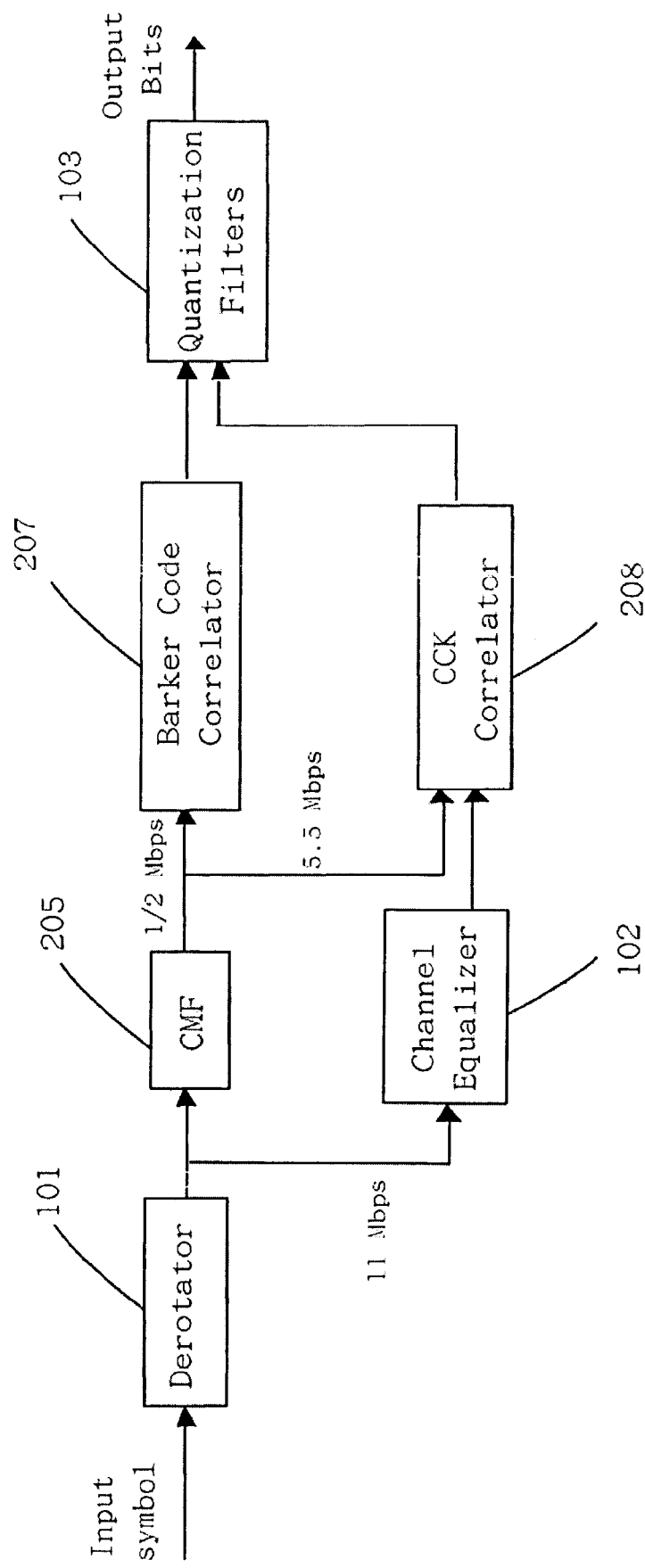
FIG. 1 is a block diagram sketchily showing a digital receiver for use in a spread spectrum communication system according to an exemplarily preferred embodiment of the present invention.

The present invention provides a devisal of a digital receiver for a wireless local area network. The digital receiver of the present invention is based on the recognitions that each modulated data signals at different data rates requires a data demodulation unit and a signal processing path to be recovered to original data stream. Based on this concept, the digital receiver of the present invention is provided with multiple data demodulation units each governs signal demodulation process of data signals at one or two data rates. Referring to FIG. 1, a block diagram sketchily showing a digital receiver for use in a spread spectrum communication system according to an exemplarily preferred embodiment of the present invention is illustrated.

The digital receiver as shown in FIG. 1 substantially includes a derotator 101, a channel matched filter (CMF) 205, a barker code correlator 207, a channel equalizer 102, a CCK correlator 208 and quantization filters 103 which is further divided into a first quantization filer and a second quantization filter. The signal processing path for modulated signals at data rate of ½ Mbps is substantially constructed with the derotator 101, channel matched filter 205, barker code correlator 207 and a first quantization filer (which is encompassed within the quantization filters 103). The signal processing path for modulated signals at data rate of 5.5 Mbps is substantially constructed with the derotator 101, channel matched filter 205, CCK correlator 208 and a second quantization filer (which is also encompassed within the quantization filters 103). In addition, the signal processing path for modulated signals at data rate of 11 Mbps is substantially constructed with the derotator 101, channel equalizer 205, CCK correlator 208 and the second quantization filer. In the following exemplary embodiment, the physical implementation of the digital receiver and the principle of the determination of signal processing path according to the present invention will be discussed in greater detail through the following descriptions with reference to the FIGS. 2, 3 and 4 attached hereto.

1. Sampling circuit: A wireless digital communication signal provided by a radio frequency demodulator (RF demodulator, which is not shown in the drawings for simplicity) is preemptively converted by a down converter (not shown) to reduce intermediate frequencies where they may be processed and converted, and then being fed into a sampling circuit 201. The sampling circuit 201 generally includes analog-to-digital converters (A/Ds) 211, the real portions (denoted by I in FIG. 3) and the imaginary portions (denoted by Q in FIG. 3) of the data signal generated by the RF demodulator are over-sampled and converted into digitized sampled signals by the analog-to-digital converters 211 operating at a fixed and asynchronous sampling rate.

2. Interpolator: After A/D conversion, the digitalized sampled signal is passed through an interpolator 202. Interpolator 202 is used to finely track the sampling phase offset, and it is able to generate samples in between those actually sampled by the A/D converter 211. By generating these intermediate samples as desired, interpolator 202 can adjust the effective sampling frequency and phase by removing any undesired carrier signal from the received signal and adding a time delay specified by the output of a numerically-controlled oscillator (NCO) 313, which will be referred to in the following descriptions.

3. Carrier Recovery Loop: After interpolation, the resulting interpolated signal is a smoothed version of the original data signal and it contains N times as many digital samples. The interpolated signal is further transferred to a carrier recovery loop 204 to compensate carrier frequency offset for precise demodulation. The carrier frequency offset is generated due to the imperfections in the transmitter, which leads to the situation where the actual carrier frequency may be slightly different from the expected frequency. At the transmitter, an oscillator generates a sinusoidal carrier signal at some known carrier frequency. Due to frequency drift, the actual carrier frequency will slightly deviate from ideal value. The carrier is multiplied by the data to modulate the signal up to a passband center frequency. At the receiver, the passband signal is multiplied by a sinusoidal signal generated by a local oscillator. Ideally, the frequency of oscillator at the receiver will exactly match the frequency of oscillator at the transmitter. In practice, their frequencies differ with each other and, instead of bringing the signal to baseband, the signal frequency will be approximate to baseband with some frequency offset. The presence of frequency offset will cause the received signal constellation to rotate. In order to remove this spinning effect before accurate symbol decision is made, a derotator 101 is used to remove this frequency offset so that the signal can be directly processed at baseband.

Figure 2:
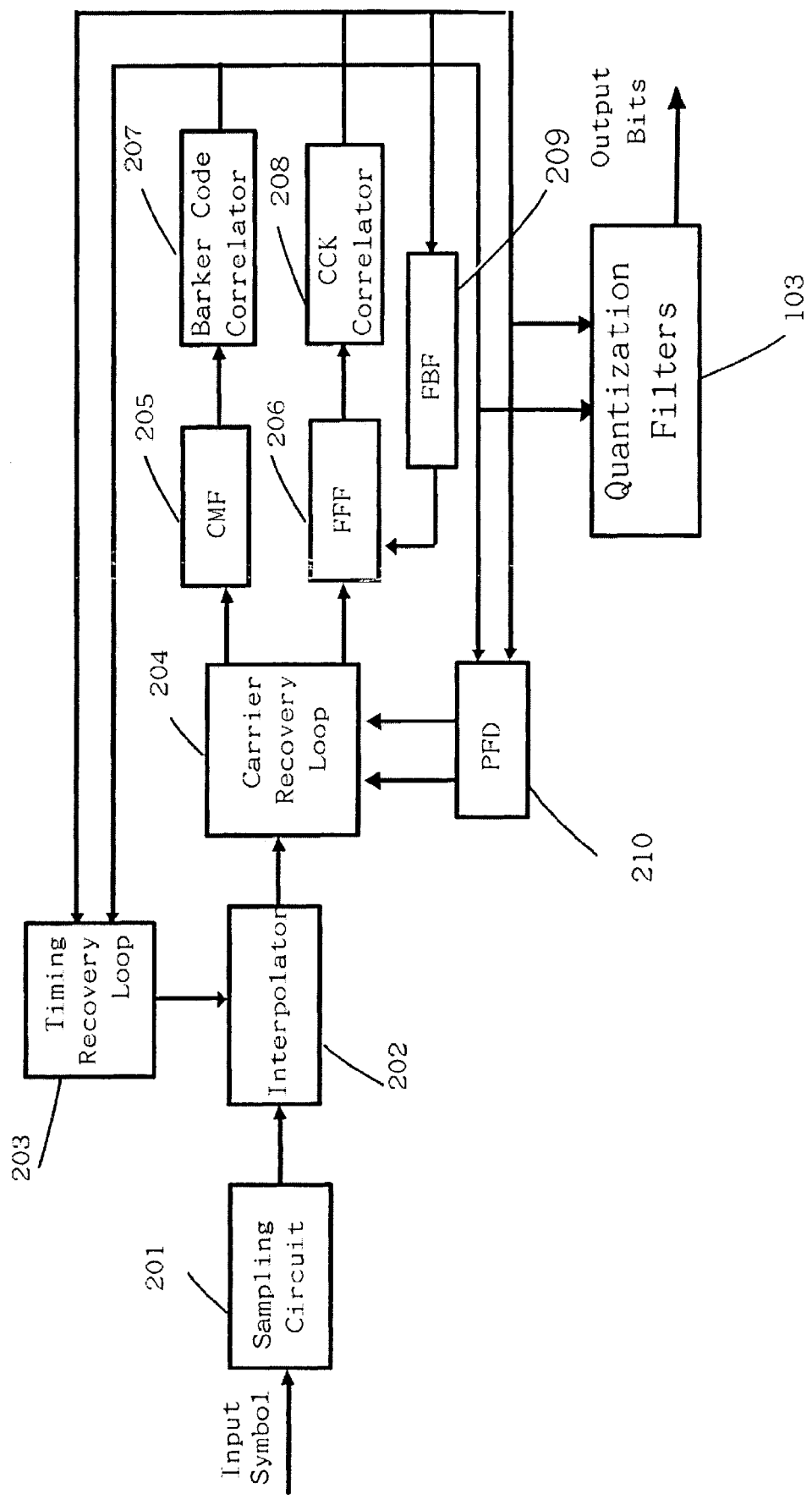
FIG. 2 diagrammatically depicts a system block diagram of a digital receiver for use in a spread spectrum communication system according to an exemplarily preferred embodiment of the present invention.
Figure 3:
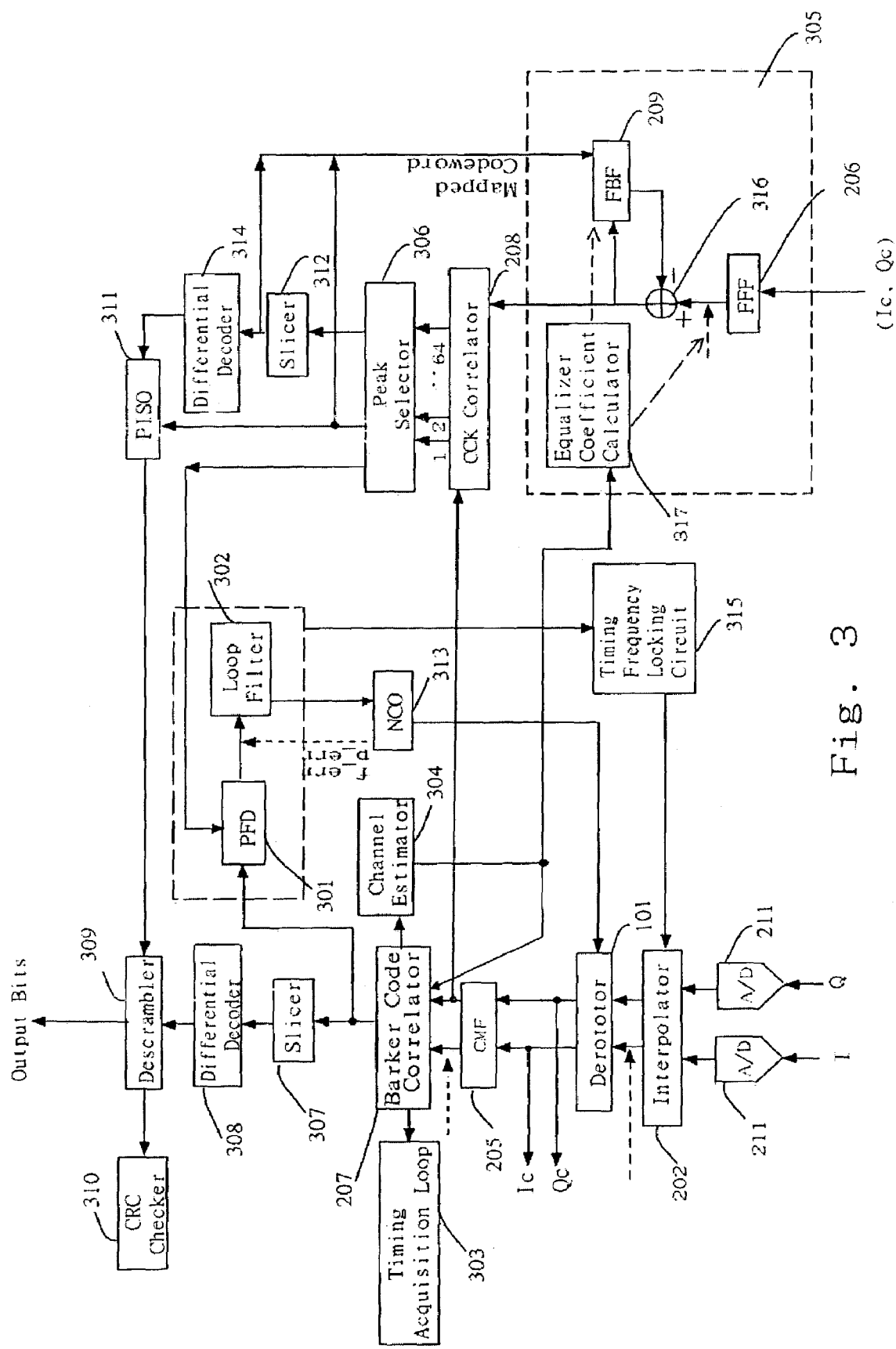
FIG. 3 is a detailed circuit block diagram illustrating the digital receiver of FIG. 2.

Nonetheless, in order to allow the derotator 101 to compensate carrier frequency offset, it is essential to calculate the amount of carrier frequency offset which can be modeled as a time-varying phase. Referring to FIGS. 2 and 3, a carrier recovery loop 203 generally include a phase/frequency detector (PFD) 301, a loop filter 302 and a numerically-controlled oscillator (NCO) 313. The phase/frequency detector 301 is used to receive sampled symbols for estimating the phase/frequency mismatch and generate an instantaneous phase/frequency error signal by converting the phase/frequency mismatch into a series of variable width pulses. The instantaneous phase/frequency error signal is filtered by a loop filter 302, typically it is implemented by a simple low-pass filter (LPF), and calculates an average phase error signal. The NCO (also known as a phase shifter) 313 allows for precise adjustment of carrier frequency based on the average phase signal generated by the loop filter 305, and it keeps track of the phase error and forces a phase offset into the demodulating carrier of received signal by sending a phase adjusting signal to the derotator 101. Thus, derotator 101 can adjust carrier frequency according to the phase adjusting signal.

4. Channel Matched Filter: The carrier-removed signal is transferred to a channel matched filter (CMF) 205 that is adaptive to be matched to the operations of spreading, pulse shape filtering and channel filtering. According to the exemplary embodiment of the present invention, the channel matched filter 205 is coupled to the outputs of the derotator 101 to compensate the affects of phase and amplitude distortions caused by the communication channel. The channel matched filter 205 is configured to extract unwanted noise from received signals and correct phase and amplitude distortions by filtering the received signal to generate in-phase signals and quadrature-phase signals, such that an optimum signal-to-noise ratio can be obtained.

5. Timing Recovery Loop: As stated above, the interpolator 202 is used to adjust sampling phase and frequency so as to obtain symbol synchronization. To this end, it is essential that two quantities must be determined by the receiver. The first one is sampling frequency. Locking the sampling frequency requires estimating the sample period such that sample can be taken at correct sample rate. Though this quantity is hypothesized to be known, oscillator drift will cause deviations from symbol rate. The other one is to determine sampling phase. Locking the sampling phase involves determining correct time within a symbol period to take a sample.

Therefore, in order to allow the interpolator 202 to adjust sampling phase and frequency so as to obtain symbol synchronization, a timing recovery loop 203 is required to calculate sampling phase and frequency offset so as to obtain symbol synchronization. As shown in FIG. 3, a phase/frequency detector (PFD) 301 is used to detect time-domain sampling phase error. The outputs of the phase/frequency detector 301 are coupled to the numerically-controlled oscillator (NCO) 313 via a loop filter 311. The numerically-controlled oscillator 313 is used to provide the interpolator 202 with interpolation coefficients and control the interpolation via frequency timing locking circuit 315 which is used to tie the frequency of oscillator within the receiver to the frequency of oscillator within the transmitter, thereby eliminating symbol rate offset due to oscillator drift. The timing recovery loop further includes a timing acquisition loop 303 to receive the sampled signal and generate a bit timing estimate.

6. Barker Code Correlator and CCK correlator: In a DSSS receiver, it employs different codes and a bank of correlators to remove pseudo-noise (PN) sequence in order and recover transmitted data stream. As stated above, IEEE 802.11 requires a symbol sequence correlator, such as a barker code correlator to despread narrowband data signals at ½ Mbps. In this exemplary embodiment, a barker code correlator 207 is arranged between the channel matched filter 205 and a first slicer 307 in the signal processing path for data signal at data rate of ½ Mbps (the function and principle of slicer will be described in the later discussions), which uses 11-chip barker code to achieve phase synchronization with received spread data signals and recover transmitted data stream. Similarly, IEEE 802.11 requires a maximum likelihood sequence decoder, for example, a CCK correlator to perform a maximum likelihood (ML) decoding process to data signals at data rate of 5.5 or 11 Mbps and make a maximum likelihood estimate of correct decoded bit sequence. Based on this knowledge, the digital receiver of the present invention incorporates a CCK correlator 208 for decoding data signal at data rate of 5.5 or 11 Mbps.

7. Channel Estimation: In a wireless communication system, transmission channels suffer from severe distortions due to frequency selective fading. In addition, channel characteristics are time-varying due to relative motion of fixed and mobile stations. As a result, in order to achieve correct transmission, the receiver must be able to estimate and compensate for channel distortion on a block-by-block basis.

Channel estimation and signal detection play an important role in a wireless communication system. In the exemplary embodiment of the present invention, a channel estimator 304 is used to coherently receive and decode an orthogonal-encoded spread spectrum signal and generate a complex channel estimate. The channel estimator 304 estimates the channel impulse response (CIR) based on the known training sequence of bits, which is unique for a certain transmitter and is repeated in every transmission burst. In this way, channel estimator 304 is able to estimate CIR for each transmission burst separately by exploiting the known transmitted data bits and corresponding received samples prior to the start-up of channel equalizer.

8. Channel Equalization: The radio channel in wireless communication system are usually multipath fading channels, which are causing inter-symbol interference (ISI) in the received signal. To remove inter-symbol interference, various kinds of channel equalizers can be used. Channel equalization is essential in wireless communication to compensate for channel distortion so that received symbols can be correctly determined. In this exemplary embodiment, the digital receiver of the present invention incorporates a decision feedback equalizer (DFE) block 305 to extract transmitted signals from received signals. DFE block 305 includes a fractionally-spaced feedforward filter (FFF) 206 with an all-pass mixed phase transfer function, an equalizer coefficient calculator 317, a combiner 316 and a symbol-spaced feedback filter (FBF) 209 with a minimum phase one. The feedforward filter 206 is a linear predication error filter used to process received signals by combining multiple copies of received signals together. Each copy of received signal is corresponding to a tap of the feedforward filter. The copy of received signals corresponding to each tap is delayed in time by a tap delay time multiplied by a tap coefficient and the multiplication results added to form feedforward filter output. Therefore, the feedforward filter 206 performs a cascade of noise-whitening filter which mitigate precursor inter-symbol interference. The feedback filter 209 is a postcursor filter which feeds previous filtering decision outputs to determine current symbol output, and thereby canceling postcursor inter-symbol interference. The equalizer coefficient calculator 317 uses training sequences generated by channel estimator 304 to determine appropriate sets of filter taps for both feedforward filter 206 and feedback filter 209. The outputs of feedfoward filter 206 are combined with corresponding outputs of feedback filter 209 by a combiner 316, and the outputs of the combiner 316 is in turn applied to the feedback filter 209, and thus completing the feedback loop.

9. Quantization Filters: In the signal processing path for data signals at data rate of ½ Mbps, a first quantization filter is employed to recover the transmitted signal. The first quantization filter includes a first slicer 307 and a differential decoder 308. The first slicer 307 arranged at the outputs of barker code correlator 207 is used for carrying out symbol quantization. The first slicer 307 is configured to receive mapped data symbols and uses a slice reference signal (the slice reference signal is not indicated in this figure) to "slice" mapped data symbol. If the level of data symbol is greater than that of the slice reference signal, the first slicer 307 outputs a high voltage level representing a logic high value; if the level of data symbol is lower than that of the slice reference signal, the first slicer 307 outputs a low voltage level representing a logic low value. In this manner, symbol quantization can be achieved.

The sliced data symbols are further processed by the first differential decoder 308. The purpose of first differential decoder 308 is used to fulfill phase ambiguity removal. As a consequence of the ambiguity of the phase generated by a phase-locked loop, a differential encoding must be performed within the transmission channel by the transmitter. The first differential decoder 308 is used to resolve phase ambiguity at receiver by converting phase changes of transmitted symbol in a reverse process compared to the differential encoding process. The decoded data symbol is further fed to a descrambler 309. The descrambler 309 is used to perform "unmapping" operation by subtracting the pseudo-noise (PN) sequence of the scrambler (not shown) in order to restore the transmitted original data bits. The original data bits are further examined by a cyclic redundancy check (CRC) checker 310 to detect an error within a header of data packet. Finally, the original data bits can be outputted through descrambler 309.

In the demodulation path for data signals at data rate of 5.5 or 11 Mbps, a second quantization filter is utilized to recover transmitted signal at date rate of 5.5 or 11 Mbps. The second quantization filter includes a peak selector 306, a second slicer 312, a second differential decoder 314 and a parallel-in-serial-out shift register 311. The peak selector 306 is coupled to the outputs of the CCK correlator 308 and is used to select largest outputs of the CCK correlator according to a threshold value so as to output parallel mapped symbols. Similarly, the output of peak selector are quantized by a second slicer 312, and the quantized digital symbols are processed by a second differential decoder 314 to remove phase ambiguity in the received signal. Next the parallel digital data symbols from the second differential decoder 314 are loaded to a PISO (parallel-in-serial-out) shift register 311 where they are converted into a serial data stream to be shifted out for transmission. The serial data stream are provided for the descrambler 309 to subtract pseudo-noise code to restore original data stream.

Next, the methodology of determination of signal demodulation process for each modulated signals at different data rates will be discussed.

Figure 4:
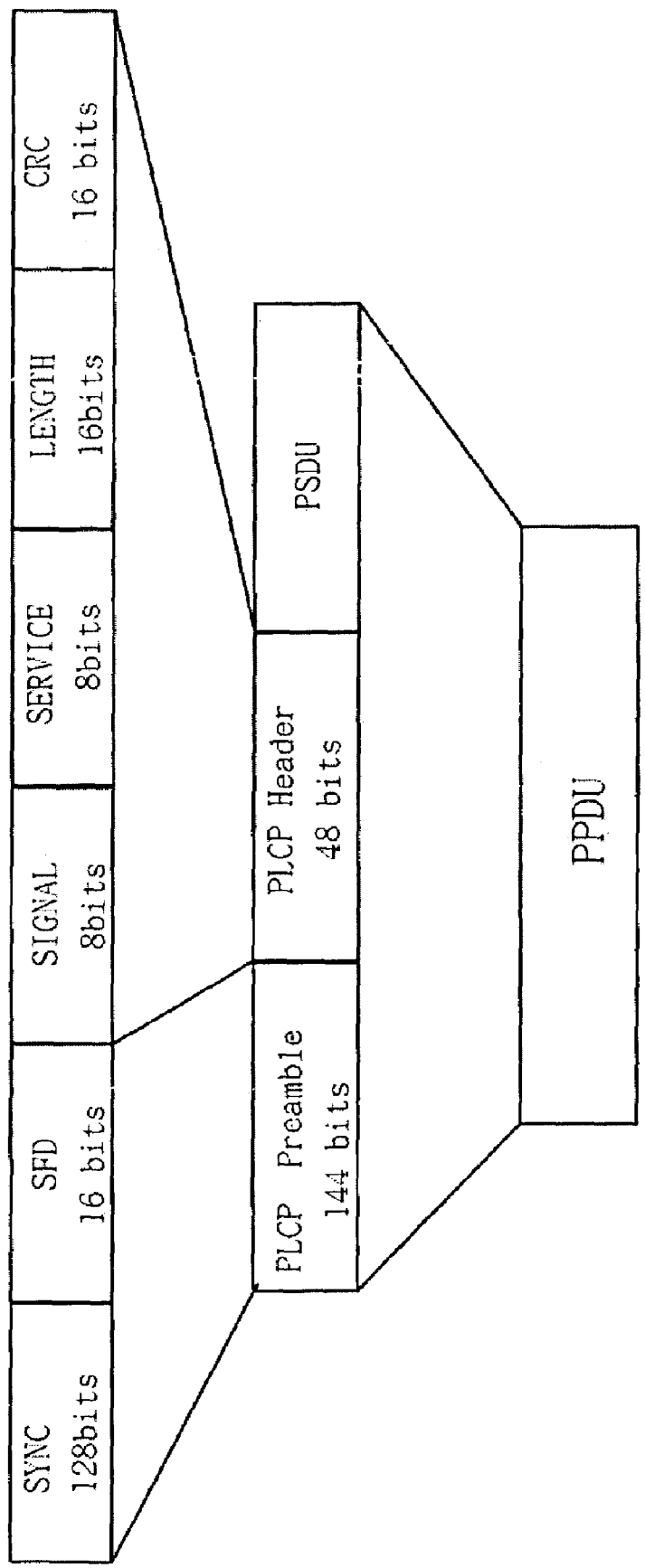
FIG. 4 is a data package layout diagram explicating a physical layer convergence protocol (PLCP) frame format in a direct sequence spread spectrum system.

FIG. 4 shows a data package layout diagram of a data packet physical layer convergence protocol (PLCP) frame in a direct sequence spread spectrum system. As shown in this diagram, the data packet transmitted in a direct sequence spread spectrum system generally contains three sections, the first section is called PLCP preamble which is further segmented into three fields, one is a 128-bit SYNC field that is used to synchronize the transmission baudrate of the control signals of physical media dependent (PMD) sublayer with PLCP frame, while another field contained in the PLCP preamble is a 16-bit SFD (start frame delimiter) field, which is used to indicate the start of header. If the SFD field is programmed with a string of 0x1111 0011 1010 0000, it is indicative that a PLCP header will be followed sequentially. Following the PCLP preamble is a PLCP header including four fields: signal field, service field, length field and CRC field. The binary value contained within the 8-bit signal field is an indication of data rates, for example, 1, 2, 5.5 or 11 Mbps. The 8-bit service field is reserved for future use. The 16-bit length field is an indication of the number of octets in the physical layer service data unit (PSDU, or payload) that is to be attached to the PLCP header. The 16-bit CRC field is used as an error detection technique that can be used to detect an error contained within the PCLP header. Following the PCLP header is the physical layer service data unit (PSDU, or payload) which stores the data bits designated to be modulated for transmission to a signal receiver in a wireless fashion. These sections are combined together to form a PLCP protocol data unit (PPDU), which is to be modulated with carrier and transmitted through transmission channels. It is to be noted that all data bits are scrambled prior to transmission.

From the above description, it is clear that once the data rate is specified in the signal field within the data header, the digital receiver is able to process modulated signals at different data rates depending on their data rates specified in the data header. In this way, a multi-purpose and versatile digital receiver for use in a direct sequence spread spectrum communication system can be derived without effort.

Although the digital receiver and the signal demodulation technique of the present invention have been described herein, it is to be noted that those of skill in the art will recognize that various modifications can be made within the spirit and scope of the present invention as further defined in the appended claims.

What is claimed is:

1. A digital receiver configured to process modulated signals at various data rates, comprising:

a sampling circuit operating at a fixed sampling rate for receiving transmitted signals and outputting a plurality of digitalized sampled signals;

a channel matched filter for expelling noise from the plurality of digitalized sampled signal at a first data rate and at a second data rate and generating in-phase and quadrature-phase signals;

a first correlator unit coupled to the channel matched filter for depreading the in-phase and quadrature-phase signals at the first data rate;

a channel equalizer which counteracts co-channel interferences, coupling to the sampling circuit, by using equalizer coefficients obtained from a plurality of noise whitening coefficients so as to generate a sequence of symbol decisions therefrom;

a second correlator unit coupled to the channel equalizer for decoding signals at the second data rate or at a third data rate;

a first quantization filter coupling to the first correlator for recovering transmitted signals at the first data rate; and a second quantization filter coupling to the second correlator for recovering transmitted signals at the second data rate and at the third data rate.

2. The digital receiver according to claim 1 wherein the sampling circuit comprises an analog-to-digital converter.

3. The digital receiver according to claim 1 further comprising:

an interpolator coupled to the sampling circuit for adjusting a sampling frequency offset of the digitalized sampled signals generated by the sampling circuit by interpolating the digitalized sampled signals according to an interpolation coefficient; and a derotator coupled to the interpolator for compensating a carrier phase offset according to a phase-adjusting signal.

4. The digital receiver according to claim 3 further comprising:

a timing recovery loop for calculating the sampling frequency offset and a sampling phase offset to control the interpolation coefficient; and a carrier recovery loop for locking on a carrier phase offset and in response thereto generating the phase-adjusting signal.

5. The digital receiver according to claim 4 wherein the timing recovery loop comprises:

a frequency detector configured to receive output from the first correlator unit and output an instantaneous symbol timing error signal;

a loop filter for receiving the instantaneous symbol timing error signal and calculating an average symbol timing error signal;

a numerically-controlled oscillator for providing the interpolator with the interpolation coefficients based on the average symbol timing error signal;

a timing frequency locking circuit which ties a frequency of an oscillator within the digital receiver to a frequency of an oscillator within a transmitter and generating the interpolation coefficient; and a timing acquisition loop for receiving the digitalized sampled signals and generating a bit timing estimate.

6. The digital receiver according to claim 4 wherein the carrier recovery loop comprises:

a phase detector configured to generate an instantaneous carrier phase error signal based on the inphase and quadrature-phase signals; and a loop filter configured to calculate an average phase error signal and generating the phase-adjusting signal based on the average phase error signal.

7. The digital receiver according to claim 1 wherein the channel equalizer comprises a decision feedback equalizer.

8. The digital receiver according to claim 1 wherein the first correlator unit comprises a barker code correlator which uses a barker code of 11 chips to despread the digitalized sampled signal at the first data rate.

9. The digital receiver according to claim 1 wherein the second correlator unit comprises a CCK correlator which performs a maximum likelihood decoding process to the digitalized sampled signals at the second data rate or at the third data rate.

10. The digital receiver according to claim 1 wherein the first quantization filter comprises:

a first slicer which quantizes output of the first correlator unit at the first date rate according to a reference slice signal to produce digital symbols; and a first differential decoder coupled to the first slicer for removing a phase ambiguity of the digital symbols.

11. The digital receiver according to claim 1 wherein the second quantization filter comprises:

a peak selector which outputs largest outputs of the second corrrlator unit as parallel digital samples;

a second slicer which quantizes the parallel digital samples at the second data rate or at the third date rate according to a reference slice signal to produce parallel digital symbols;

a second differential decoder which removes a phase ambiguity from the parallel digital symbols; and a parallel-in-serial-out shift register for converting the parallel digital symbols into serial digital symbols.

12. The digital receiver according to claim 10 further comprising: a descrambler coupled to the first quantization filter and the second equalization filter for subtracting a pseudo noise sequence from digital symbols; and a cyclic redundancy check (CRC) checker configured to detect an error within a header of a data packet.

13. The digital receiver according to claim 1 wherein the first data rate is 1 Mbps or 2 Mbps.

14. The digital receiver according to claim 1 wherein the second data rate is 5.5 Mbps and the third data rate is 11 Mbps.

15. A digital receiver for processing modulated data signals at various data rates, comprising: a sampling circuit operating at a fixed sampling rate for receiving transmitted signals and outputting digitalized sampled signals;

a derotator coupled to the sampling circuit for compensating a carrier phase offset according to a phase-adjusting signal;

a channel matched filter for expelling noise from output of the derotator and generating in-phase and quadrature-phase signals;

a first correlator unit coupled to the channel matched filter for depreading the in-phase and quadrature-phase signals;

a channel equalizer which counteracts co-channel interferences, coupling to the sampling circuit, by using equalization coefficients obtained from a plurality of noise whitening coefficients so as to generate a sequence of symbol decisions therefrom;

a second correlator unit coupled to the channel equalizer or the channel matched filter for decoding modulated signals;

a first quantization filter coupling to the first correlator for recovering transmitted signals at the first data rate; and a second quantization filter coupling to the second correlator for recovering transmitted signals at the second data rate or at the third data rate;

wherein a received signal at a first data rate is processed through a first signal processing path constituted by the sampling circuit, the derotator, the channel matched filter, the first correlator unit and the first quantization filter, a received signal at a second date rate is processed through a second signal processing path constituted by the sampling circuit, the derotator, the channel matched filter, the second correlator unit and the second quantization filter, and a received signal at a third date rate is processed through a third signal processing path constituted by the sampling circuit, the derotator, the channel equalizer, the second correlator unit and the second quantization filter.

16. The digital receiver according to claim 15 wherein the sampling circuit comprises an analog-to-digital converter.

17. The digital receiver according to claim 15 further comprising an interpolator coupled to the sampling circuit for adjusting a sampling frequency offset of the digitalized sampled signals generated by the sampling circuit by interpolating the digitalized sampled signals according to an interpolation coefficient.

18. The digital receiver according to claim 17 further comprising:
   a timing recovery loop for calculating a sampling frequency offset and a sampling phase offset to control an interpolation of the interpolator; and
   a carrier recovery loop for locking on a carrier phase offset and in response thereto generating the phase-adjusting signal.

19. The digital receiver according to claim 18 wherein the timing recovery loop comprises:
   a frequency detector configured to receive the output from the first correlator unit and output an instantaneous symbol timing error signal;
   a loop filter for receiving the instantaneous symbol timing error signal and calculating an average symbol timing error signal;
   a numerically-controlled oscillator for providing the interpolator with the interpolation coefficients based on the average symbol timing error signal;
   a timing frequency locking circuit, coupling to the interpolator, which ties a frequency of an oscillator within the digital receiver to a frequency of an oscillator within a transmitter; and
   a timing acquisition loop coupling to the first correlator for receiving the digitalized sampled signals and generating a bit timing estimate.

20. The digital receiver according to claim 18 wherein the carrier recovery loop comprises:
   a phase detector configured to generate an instantaneous carrier phase error signal based on the in-phase and quadrature-phase signals; and
   a loop filter coupling to the derotator and the phase detector configured to calculate an average phase error signal according to the instantaneous carrier error signal and generating the phase-adjusting signal based on the average phase error signal.

21. The digital receiver according to claim 15 wherein the channel equalizer comprises a decision feedback equalizer.

22. The digital receiver according to claim 15 wherein the first correlator unit comprises a barker code correlator which uses a barker code of 11 chips to despread the digitalized sampled signal at the first data rate.

23. The digital receiver according to claim 15 wherein the second correlator unit comprises a CCK correlator which performs a maximum likelihood decoding process to the digitalized sampled signals at the second data rate and at the third data rate.

24. The digital receiver according to claim 15 wherein the first quantization filter comprises:
   a first slicer which quantizes output from the first correlator unit at the first date rate according to a reference slice signal to produce digital symbols; and
   a first differential decoder coupled to the first slicer for removing a phase ambiguity of the digital symbols.

25. The digital receiver according to claim 15 wherein the second quantization filter comprises:
   a peak selector which outputs largest outputs of the second corrrlator unit as parallel digital samples;
   a second slicer which quantizes the parallel digital samples at the second data rate or at the third date rate according to a reference slice signal to produce parallel digital symbols;
   a second differential decoder which removes a phase ambiguity from the parallel digital symbols; and
   a parallel-in-serial-out shift register for converting the parallel digital symbols into serial digital symbols.

26. The digital receiver according to claim 15 further comprising:
   a descrambler coupled to the first quantization filter and the second quantization filter for subtracting a pseudo noise sequence from digital symbols; and
   a cyclic redundancy check (CRC) checker coupling to the descrambler configured to detect an error within a header of a data packet.

27. The digital receiver according to claim 15 wherein the first data rate is 1 Mbps or 2 Mbps.

28. The digital receiver according to claim 15 wherein the second data rate is 5.5 Mbps and the third data rate is 11 Mbps.

29. A digital receiver for processing modulated data signals at various data rates, comprising:
   a sampling circuit operating at a fixed sampling rate for receiving transmitted signals and outputting a plurality of digitalized sampled signals;
   an interpolator coupled to the sampling circuit for adjusting a sampling frequency offset of the plurality of digitalized sampled signals generated by the sampling circuit by interpolating the digitalized sampled signals according to an interpolation coefficient;
   a derotator coupled to the interpolator for compensating a carrier phase offset according to a phase-adjusting signal;
   a timing recovery loop for calculating a sampling frequency offset and a sampling phase offset to control an interpolation of the interpolator;
   a carrier recovery loop for locking on a carrier phase offset and in response thereto generating the phase-adjusting signal;
   a channel matched filter for expelling noise from output from the derotator and generating in-phase and quadrature-phase signals;
   a first correlator unit coupled to the channel matched filter for depreading the digitalized sampled signal;
   a channel equalizer, coupling to the derotator, which counteracts co-channel interferences by using equalization coefficients obtained from a plurality of noise whitening coefficients so as to generate a sequence of symbol decisions therefrom;
   a second correlator unit coupled to the channel equalizer or channel matched filter for decoding modulated signals;
   a first quantization filter coupling to the first correlator for recovering transmitted signals at the first data rate; and
   a second quantization filter coupling to the second correlator for recovering transmitted signals at the second data rate or at the third data rate;
   wherein a received signal at a first data rate is processed through a first signal processing path constituted by the sampling circuit the interpolator, the derotator, the channel matched filter, the first correlator unit and the first quantization filter, a received signal at a second date rate is processed through a second signal processing path constituted by the sampling circuit the interpolator, the derotator, the channel matched filter, the second correlator unit and the second quantization filter, and a received signal at a third date rate is processed through a third signal processing path constituted by the sampling circuit the interpolator, the derotator, the channel equalizer, the second correlator unit and the second quantization filter.

30. The digital receiver according to claim 29 wherein the sampling circuit comprises an analog-to-digital converter.

31. The digital receiver according to claim 29 wherein the timing recovery loop comprises:
   a frequency detector configured to receive the digitalized sampled signals and output an instantaneous symbol timing error signal;
   a loop filter for receiving the instantaneous symbol timing error signal and calculating an average symbol timing error signal;
   a numerically-controlled oscillator for providing the interpolator with the interpolation coefficients based on the average symbol timing error signal;
   a timing frequency locking circuit, coupling to the interpolator, which ties a frequency of an oscillator within the digital receiver to a frequency of an oscillator within a transmitter; and
   a timing acquisition loop coupling to the first correlator for receiving the digitalized sampled signals and generating a bit timing estimate.

32. The digital receiver according to claim 29 wherein the carrier recovery loop comprises:
   a phase detector configured to generate an instantaneous carrier phase error signal based on the in-phase and quadrature-phase signals; and
   a loop filter coupling to the derotator and the phase detector configured to calculate an average phase error signal according to the instantaneous carrier error signal and generating the phase-adjusting signal based on the average phase error signal.

33. The digital receiver according to claim 29 wherein channel equalizer comprises a decision feedback equalizer.

34. The digital receiver according to claim 29 wherein the first correlator unit comprises a barker code correlator which uses a barker code of 11 chips to despread the digitalized sampled signal at the first data rate.

35. The digital receiver according to claim 29 wherein the second correlator unit comprises a CCK correlator which performs a maximum likelihood decoding process to the digitalized sampled signals at the second data rate or at the third data rate.

36. The digital receiver according to claim 29 wherein the first quantization filter comprises:
   a first slicer which quantizes digitalized sampled signals at the first date rate according to a reference slice signal to produce digital symbols; and
   a first differential decoder coupled to the first slicer for removing a phase ambiguity of the digital symbols.

37. The digital receiver according to claim 29 wherein the second quantization filter comprises:
   a peak selector which outputs largest outputs of the second corrrlator unit as parallel digital samples;
   a second slicer which quantizes the parallel digital samples at the second data rate or at the third date rate according to a reference slice signal to produce parallel digital symbols;
   a second differential decoder which removes a phase ambiguity from the parallel digital symbols; and
   a parallel-in-serial-out shift register for converting the parallel digital symbols into serial digital symbols.

38. The digital receiver according to claim 29 further comprising:
   a descrambler coupled to the first quantization filter and the second qualization filter for subtracting a pseudo noise sequence from digital symbols; and
   a cyclic redundancy check (CRC) checker configured to detect an error within a header of a data packet.

39. The digital receiver according to claim 29 wherein the first data rate is 1 Mbps or 2 Mbps.

40. The digital receiver according to claim 29 wherein the second data rate is 5.5 Mbps and the third data rate is 11 Mbps.

* * * * *